P. LEBOUCHER.
MEANS FOR MEASURING ANGULAR DISPLACEMENTS.
APPLICATION FILED JUNE 3, 1919.

1,331,069.

Patented Feb. 17, 1920.

Inventor:
Paul Leboucher,
by
Albert E. Davis
His Attorney.

UNITED STATES PATENT OFFICE.

PAUL LEBOUCHER, OF PARIS, FRANCE.

MEANS FOR MEASURING ANGULAR DISPLACEMENTS.

1,331,069.  Specification of Letters Patent.  Patented Feb. 17, 1920.

Application filed June 3, 1919. Serial No. 301,535.

*To all whom it may concern:*

Be it known that I, PAUL LEBOUCHER, a citizen of the French Republic, residing at Paris, France, have invented certain new and useful Improvements in Means for Measuring Angular Displacements, of which the following is a specification.

My invention relates to instruments of precision which measure angular displacements and has for its object an improved apparatus for making such angular measurements easily and accurately.

In a mechanical system suppose there are several members, all at the same time executing synchronous movements of rotation, then their relative positions will not have been changed at the end of a period of time $$T + \frac{2\pi n}{\omega}$$

from their known relative positions at time T, where $\omega$ denotes average angular velocity, and $n$ is an integral denoting complete rotations. If now we imagine vectors drawn arbitrarily in these members from the axis of rotation, the angular displacements of these vectors with respect to each other about this axis defines the initial relative positions of these members. Also any deviation of these vectors from their initial positions defines the relative angular displacements which may be caused between the members of such system by the action of external agencies.

In the practice of my invention I make use of coincident makes and breaks in an electric circuit in determining with precision the magnitude of these angular displacements. In order that each rotating member may produce a make and break in an electric circuit, I employ cylindrical contact devices having conducting segments on each rotating member placed concentrically with the axis of rotation and having sufficient arcuate length to span an angle at the center which is equal to, or greater than, the greatest angular displacement it is intended to measure. Brushes conveniently bear on these contact devices which may be adjusted relatively thereto by the aid of micrometer screws. By the aid of these screws and by observing the instant of the make and break in the circuit by the contact devices, the angular displacements to be measured are easily and accurately ascertained.

Figure 1:
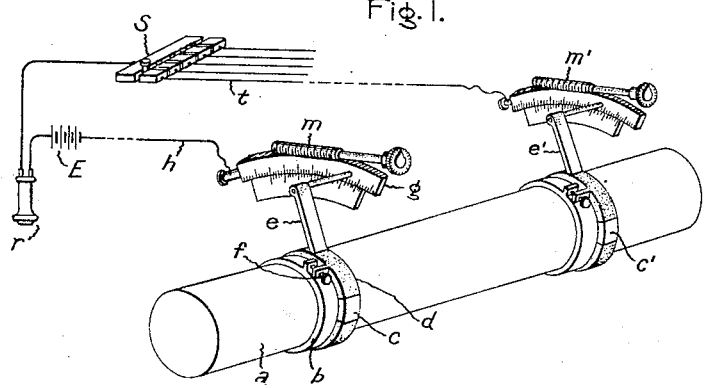
Figure 2:
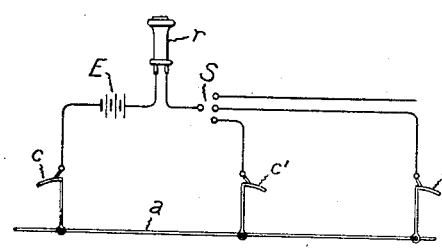
Figure 3:
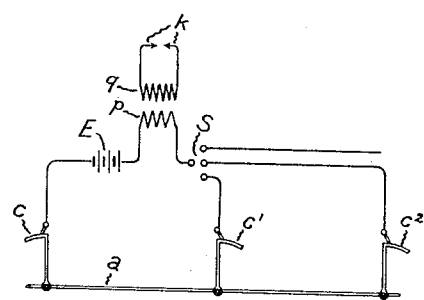
Figure 4:
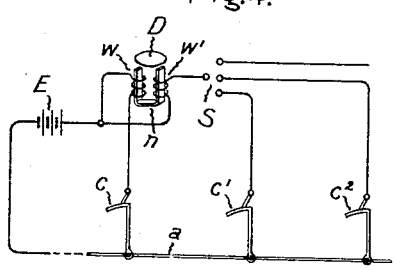
Figure 5:
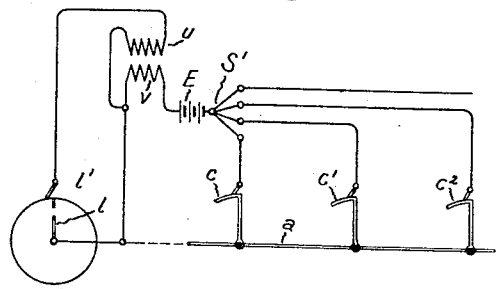

For a more complete understanding of the application and advantages of my invention reference should be had to the following detailed description when taken in connection with the accompanying drawing in which:

Figure 1 shows my invention as applied to measuring the angular displacements between portions of a rotating shaft; the shaft being chosen for purposes of illustration as the mechanical system. Fig. 2 shows in diagrammatic fashion the arrangement of electric circuits employed in accordance with my invention in Fig. 1. Fig. 3 shows in similar fashion a modified arrangement of electric circuits which may be used in lieu of that shown in Fig. 2 when applying to my invention. Figs. 4 and 5 show still further modification of the electric circuits which may be used in accordance with my invention.

Referring to the drawings and to Fig. 1 in particular, $a$ denotes a shaft, here taken as the mechanical system whose parts comprise the members which are executing synchronous rotary movements. To the collar $b$, fixed on the shaft $a$, is conveniently secured the conducting segment $c$ and the non-conducting segment $d$. The arcuate span of segment $c$, as before remarked, is made equal to or greater than the greatest angular displacement which it is proposed to measure, while the segment $d$ completes the arc of a circle with segment $c$ so that a smooth contact surface is presented to the brush $e$ wiping on the surface of the contact device thus formed. A screw $f$ is here shown as provided for adjusting the initial setting of the contact segment $c$ with respect to the shaft $a$. The brush $e$ is adjusted by the micrometer screw $m$; it being secured to the movable portion $g$ of the micrometer gage which reads whole turns of the screw $m$. The conductor $h$ connects the brush $e$ to a suitable source of electrical energy E, here shown as a battery.

To observe the exact moment of make or break (as the case may be) of the circuit through the contact device, a telephone receiver $r$ is connected in series with the source E; which receiver is also connected to switch-device $s$ for selecting the branch, as $t$, through which the circuit is to be completed.

The branch $t$ of the circuit is shown as being in series with a brush $e'$ which wipes on a contact $c'$ turning with the shaft $a$ and secured thereto in a manner similar to contact $c$. The brush $e'$ is also provided with a regulating micrometer screw $m'$, similar to screw $m$. Other branches would be provided also with brushes and contacts, as $c^2$, etc., for interrupting the circuits in parallel with the first branch.

In the process of measuring angular displacements by the arrangement shown in Figs. 1 and 2, suppose the position of the brush and contact at $c$ is taken as the base of reference. The initial positions of the other brushes and contacts may be arbitrarily chosen as convenience may dictate, their micrometer readings being first noted. These positions would then be regulated by the aid of the micrometer screws $m'$, etc., so that the noise in the receiver $r$ is just audible (or not audible as the case may be). The micrometer would again be read and the angular displacements so observed would be those of the system when regulation commenced. It is, of course, assumed that no disturbing influence intervenes during the period of measurement.

If definite external agencies interfere to change this regulation, a new regulation would be effected by the micrometer screws in order to measure the angular displacements produced by these agencies.

If such agencies interfere periodically, a series of micrometer readings would be made, each referred to the basic system.

Instead of using a telephone receiver to observe the moment of break or make in the circuit at the contacts, the spark from a spark coil may be used equally well for this purpose as indicated in Fig. 3, where $k$ denotes the spark-gap electrodes placed across the terminals of the secondary $q$ of an induction coil whose primary $p$ is in series with the source of electrical energy E.

A differentially actuated telephone receiver may likewise be used in place of the telephone receiver $r$; the mode of connecting such differential receiver being indicated in Fig. 4.

In Fig. 4 the differential receiver is shown as having windings $w$ and $w'$ on the magnet $n$ to influence the diaphragm D. One winding is connected in series with the source E and contact $c$, the other winding $w'$ being connected in parallel with winding $w$ through a branch circuit including one of the contacts $c'$, $c^2$, etc., but in series with source E. The micrometers would then be adjusted for reading until coincidence in the make and break of the parallel circuits was observed in the receiver when the sound would be weakened.

I may also employ parallel circuits when visually observing the moment of coincidence in the make and break of the circuits by the arrangement shown in Fig. 5, where one electrode $l$ of the spark gap, is made to rotate with the shaft $a$; the other denoted $l'$ being stationary. This gap is shown as connected across the terminals of the secondary winding $u$ of the induction coil whose primary $v$ is connected in series with the source E and contact $c$, the branches containing contacts $c'$, $c^2$, etc., all being connected in parallel with the contact $c$ by means of the device $s'$. The micrometers would here also be adjusted to give a coincident spark across the spark gap, which could easily be observed by reason of the revolving electrode.

It is obvious that my invention may be used instead of telemeters on torsiometers and like instruments of precision, such as geodetic instruments, indicators for showing the deviation of ships from their course, order transmitting devices, distance control devices, etc.

While I have here shown and described several embodiments of my invention which are at present the best means known to me for carrying the same into effect, I would have it understood that this is merely an illustration and that I do not mean to be limited to the precise details disclosed nor in the choice of recognized equivalents except as defined in my claims hereunto appended.

What I claim as new and desire to secure by Letters Patent of the United States, is:

1. In a mechanical system whose members are in synchronous rotation, the combination with relatively movable contacts rotating with said members, parallel electric circuits including said contacts, devices for indicating the moment of make and break in said circuits when said contacts rotate, and means both for regulating the instant of make and break in said circuits and for indicating the angular displacement of said contacts effected by such regulation.

2. In a mechanical system whose members are in synchronous rotation, the combination with relatively movable contacts rotating with said members, parallel electric circuits including said contacts, devices for indicating the moment of make and break in said circuits when said contacts rotate, and micrometer screws for effecting the relative movement of said contacts and regulating the instant of make and break in said circuits.

3. In a mechanical system whose members are in synchronous rotation, the combination with relatively movable contacts rotating with said members, said contacts comprising brushes and coöperating conducting sectors carried respectively by said members and having an arcuate length at least as great as the angular displacement of said members to be measured during rotation, electric circuits including said contacts, and a device for indicating the moment of make and break in said circuit at said contacts, of micrometer screws arranged both for regulating the instant of make and break at said contacts and for indicating the angular displacement of said members when coincidence in said make and break is effected.

In witness whereof, I have hereunto set my hand this 29th day of May, 1919.

P. LEBOUCHER.